United States Patent
Min et al.

(10) Patent No.: US 12,300,870 B2
(45) Date of Patent: May 13, 2025

(54) PARAMETRIC DEVICE COMPRISING OPTICAL MATERIALS SPATIOTEMPORALLY VARYING PERMITTIVITY

(71) Applicants: KOREA ADVANCED INSTITUTE OF SCIENCE AND TECHNOLOGY, Daejeon (KR); CENTER FOR ADVANCED META-MATERIALS, Daejeon (KR)

(72) Inventors: Bumki Min, Daejeon (KR); Seojoo Lee, Daejeon (KR); Jagang Park, Daejeon (KR); Hyukjoon Cho, Daejeon (KR)

(73) Assignees: KOREA ADVANCED INSTITUTE OF SCIENCE AND TECHNOLOGY, Daejeon (KR); CENTER FOR ADVANCED META-MATERIALS, Daejeon (KR)

( * ) Notice: Subject to any disclaimer, the term of this patent is extended or adjusted under 35 U.S.C. 154(b) by 846 days.

(21) Appl. No.: 17/408,245

(22) Filed: Aug. 20, 2021

(65) Prior Publication Data
US 2022/0057544 A1  Feb. 24, 2022

(30) Foreign Application Priority Data

Aug. 21, 2020  (KR) .................. 10-2020-0105476
Jan. 21, 2021  (KR) .................. 10-2021-0008784

(51) Int. Cl.
| | | |
|---|---|---|
| *H01P 7/08* | (2006.01) | |
| *G02B 1/00* | (2006.01) | |
| *G02B 5/30* | (2006.01) | |

(52) U.S. Cl.
CPC ............. *H01P 7/088* (2013.01); *G02B 1/002* (2013.01); *G02B 5/30* (2013.01)

(58) Field of Classification Search
CPC .......... H01P 7/088; G02B 1/002; G02B 5/30; G02B 5/3083
See application file for complete search history.

(56) References Cited

FOREIGN PATENT DOCUMENTS

| CN | 102683842 A | * | 9/2012 |
|---|---|---|---|
| CN | 102744922 A | * | 10/2012 |
| JP | 3526206 B2 | | 5/2004 |
| KR | 101765865 | | 8/2017 |
| WO | WO-2019/039530 A1 | | 2/2019 |

OTHER PUBLICATIONS

Korean Office Action on KR Application No. 10-2021-0008784 dated Nov. 29, 2022.

* cited by examiner

*Primary Examiner* — Andrea Lindgren Baltzell
*Assistant Examiner* — Kimberly E Glenn
(74) *Attorney, Agent, or Firm* — FOLEY & LARDNER LLP

(57) ABSTRACT

A multifunctional parametric device using an optical material in which permittivity is spatiotemporally modulated according to the present invention may be used as a frequency converter and oscillator according to a design characteristic. Since a converted and oscillated frequency is determined according to a modulation frequency of a thin slab of which permittivity is spatiotemporally modulated, a user is capable of actively determining a frequency modulation and oscillation characteristic using the parametric device.

4 Claims, 7 Drawing Sheets

PARAMETRIC DEVICE COMPRISING OPTICAL MATERIALS SPATIOTEMPORALLY VARYING PERMITTIVITY

CROSS-REFERENCE TO RELATED APPLICATIONS

This application claims priority to and the benefit of Korean Patent Application No. 10-2020-0105476 filed in the Korean Intellectual Property Office on Aug. 21, 2020, and Korean Patent Application No. 10-2021-0008784 filed in the Korean Intellectual Property Office on Jan. 21, 2021 the entire contents of which are incorporated herein by reference.

TECHNICAL FIELD

The present invention relates to a parametric device including an optical material of which permittivity is spatiotemporally modulated. In particular, the present invention relates to a multi-functional parametric device which is implementable as a frequency converter or an electromagnetic wave oscillator, and includes an optical material of which permittivity is spatiotemporally modulated.

BACKGROUND ART

A general method for obtaining frequency conversion and oscillation characteristics of electromagnetic waves is to utilize optical properties of a material. That is, frequency conversion and oscillation devices utilizing devices utilizing optical nonlinearity or gain characteristics exhibited by materials have practically yielded a lot from the microwave band to the X-ray domain.

However, the method has a limitation in that the value of the frequency and conversion efficiency that may be converted according to inherent nonlinearity and gain characteristics of the material may be limited. There is a need for a device made of an optical material utilizable as a frequency converter and an oscillator in a band in which it is difficult to expect frequency conversion and oscillation with the existing optical properties.

SUMMARY OF THE INVENTION

The problem to be solved by the present invention is to provide a parametric device which may be used as a frequency converter and an oscillator in a band in which it is difficult to expect frequency conversion and oscillation with existing optical properties.

The problem to be solved by the present invention is to provide a parametric device in which a user is capable of controlling a conversion frequency when the parameter device operates as a frequency converter.

The problem to be solved by the present invention is to provide a parametric device in which a user is capable of designing amplification efficiency when the parameter device operates as an oscillator.

The problem to be solved by the present invention is to provide a parametric device in which a user is capable of controlling an amplification frequency when the parameter device operates as an amplifier.

An exemplary embodiment of the present invention provides a parametric device, including: a plurality of slabs of which permittivity is periodically changed over time and which has a predetermined thickness in which the plurality of slabs is arranged at regular intervals.

The parametric device may be operated as a frequency modulator before a specific time $t_{tp}$, and is operated as an oscillator after the specific time.

A material included in the slab may be different according to a frequency band, when the frequency band is a microwave band, the slab includes a metamaterial, and when the frequency band is a terahertz band, the slab includes a low temperature gallium arsenic (LT-GaAs) or graphene.

A distance (or a gap) between two adjacent slabs among the plurality of slabs may be shorter than an incident wavelength and a wavelength (=speed of light/$f_m$) according to a permittivity change period, and $f_m$ is a modulation frequency of the permittivity of the slab.

When the number of slabs and a value of the amount of modulation of the permittivity of the slab are large, a frequency growing rate may increases.

Another exemplary embodiment of the present invention provides a parametric device, including: a substrate; a first metamaterial layer patterned on one surface of the substrate and has a shape of "⊏"; a second metamaterial layer patterned on one surface of the substrate and has a shape of "⊐", disposed to be adjacent to the first metamaterial layer, and having both ends facing both ends of the first metamaterial layer; and a varactor disposed between one end between the both ends of the first metamaterial layer and one end between both ends of the second metamaterial layer, and causing a time-varying characteristic of the permittivity of the first and second metamaterial layers according to application of an AC voltage.

The exemplary embodiment further comprises: a first line trace disposed on the substrate at one side of each of the first and second metamaterial layers; a second line trace disposed on the substrate at another side of each of the first and second metamaterial layers; a first connection trace connecting the other end between the both ends of the first metamaterial layer and the first line trace; a second connection trace connecting the other end between the both ends of the second metamaterial layer and the second line trace; and a phase shifter disposed in the first line trace.

The first and second metamaterial layers may have characteristics of an LC resonator in the microwave band.

The varactor may have the characteristics of a capacitor connected in parallel to the effective capacitance of the LC resonator.

The phase shifter may match the phase of the (AC+DC) signal received by the varactor.

Still another exemplary embodiment of the present invention provides a parametric system, including: an AC voltage providing unit configured to output an AC voltage signal; a DC voltage providing unit configured to output a DC voltage signal; a bias tee configured to sum the AC voltage signal and the DC voltage signal and output the summed voltage signal; a power divider configured to receive the voltage signal output from the bias tee and divide the received voltage signal to a plurality of output terminals; and a parametric device connected to the plurality of output terminals of the power divider and including a plurality of unit parametric devices arranged in a matrix form.

The unit parametric device includes: a first metamaterial layer patterned on one surface of a substrate and has a shape of "⊏"; a second metamaterial layer patterned on one surface of the substrate and has a shape of "⊐", disposed to be adjacent to the first metamaterial layer, and having both ends facing both ends of the first metamaterial layer; varactor disposed between one end between the both ends of the first metamaterial layer and one end between both ends of the second metamaterial layer, and causing a time-varying characteristic of the permittivity of the first and second metamaterial layers according to application of an AC voltage; a first line trace disposed on the substrate at one side of each of the first and second metamaterial layers and connected with the output terminal of the power divider; a second line trace disposed on the substrate at another side of each of the first and second metamaterial layers and connected to a ground; a first connection trace connecting the other end between the both ends of the first metamaterial layer and the first line trace; a second connection trace connecting the other end between the both ends of the second metamaterial layer and the second line trace; and a phase shifter disposed in the first line trace.

The first and second metamaterial layers may have characteristics of an LC resonator in the microwave band.

The varactor may have the characteristics of a capacitor connected in parallel to the effective capacitance of the LC resonator.

The phase shifter may match the phase of the (AC+DC) signal received by the varactor.

The plurality of unit parametric devices may be connected to the first line trace in parallel.

According to the exemplary embodiments of the present invention, it is possible to convert and amplify an electromagnetic wave in a wavelength band in which it is difficult to expect frequency conversion and amplified oscillation.

According to the exemplary embodiments of the present invention, it is possible to control an electromagnetic wave conversion frequency and oscillation frequency according to a purpose.

According to the exemplary embodiments of the present invention, it is possible to control an electromagnetic wave growing rate according to time according to a purpose.

According to the exemplary embodiments of the present invention, the present invention may be an alternative to a frequency amplifier of a band in which it is difficult to expect the frequency amplification with a frequency conversion device using nonlinearity.

According to the exemplary embodiments of the present invention, it is possible to implement a directional electromagnetic wave device that allows a user to arbitrarily designate a propagation direction of the electromagnetic wave.

Figure 3:
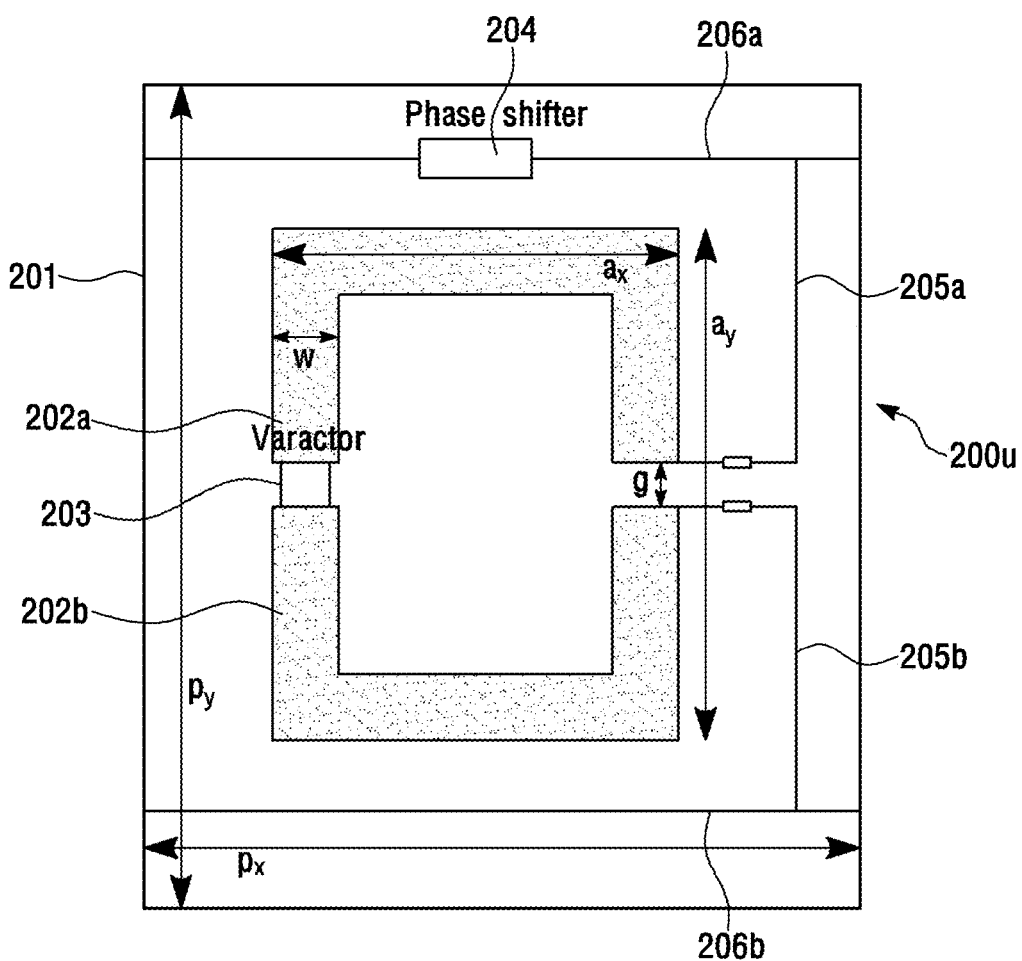
FIG. 3 is a top plan view of only a unit parametric device of a parametric device 200 illustrated in FIG. 2.
Figure 5:
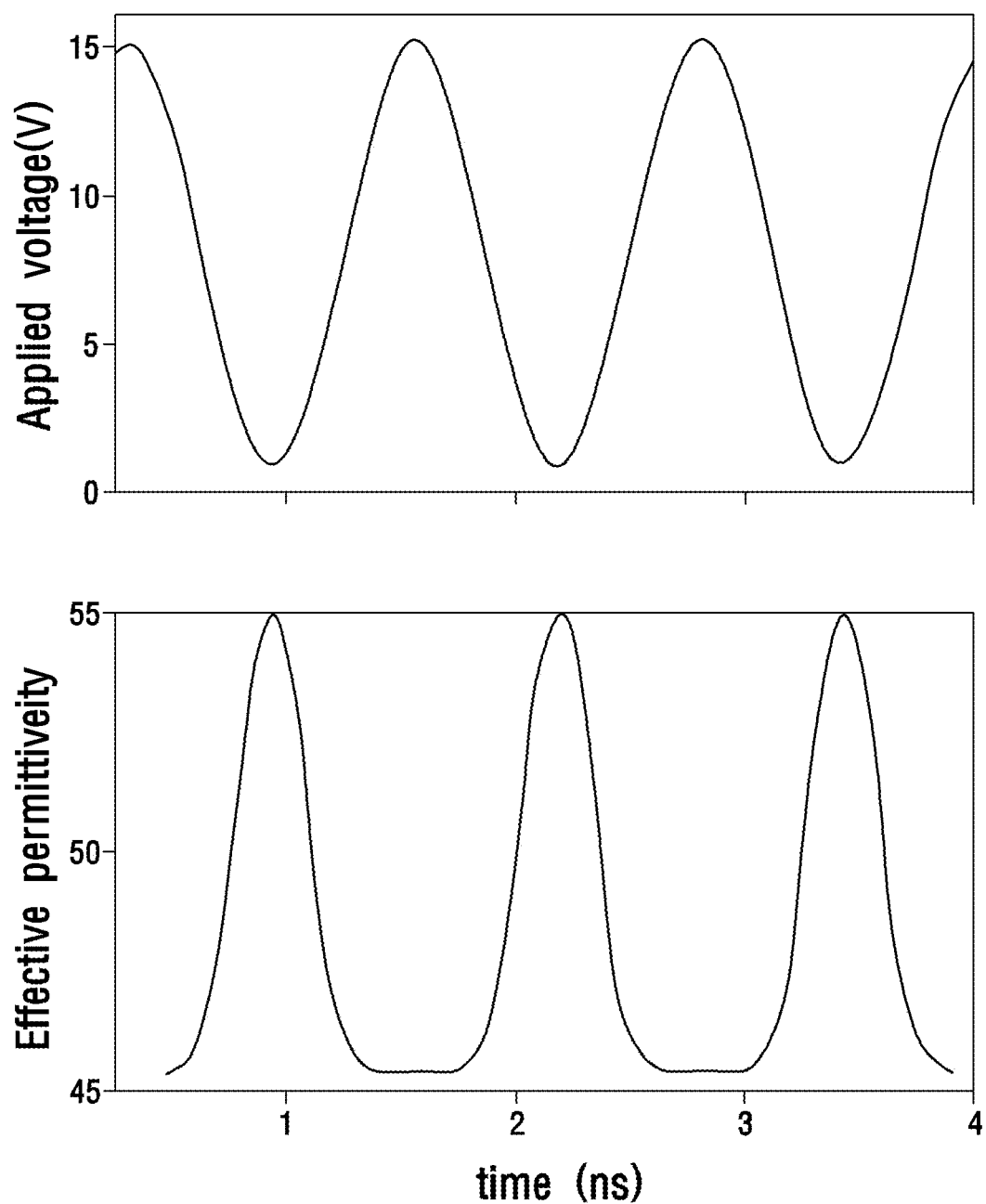

An upper graph of FIG. 5 illustrates the case where a magnitude of an AC voltage applied to a varactor 203 illustrated in FIG. 3 is periodically changed according to time, and a lower graph of FIG. 5 illustrates effective permittivity of the unit parameter device 200u illustrated in FIG. 3 is periodically changed according to time by the varactor 203.

Figure 2:
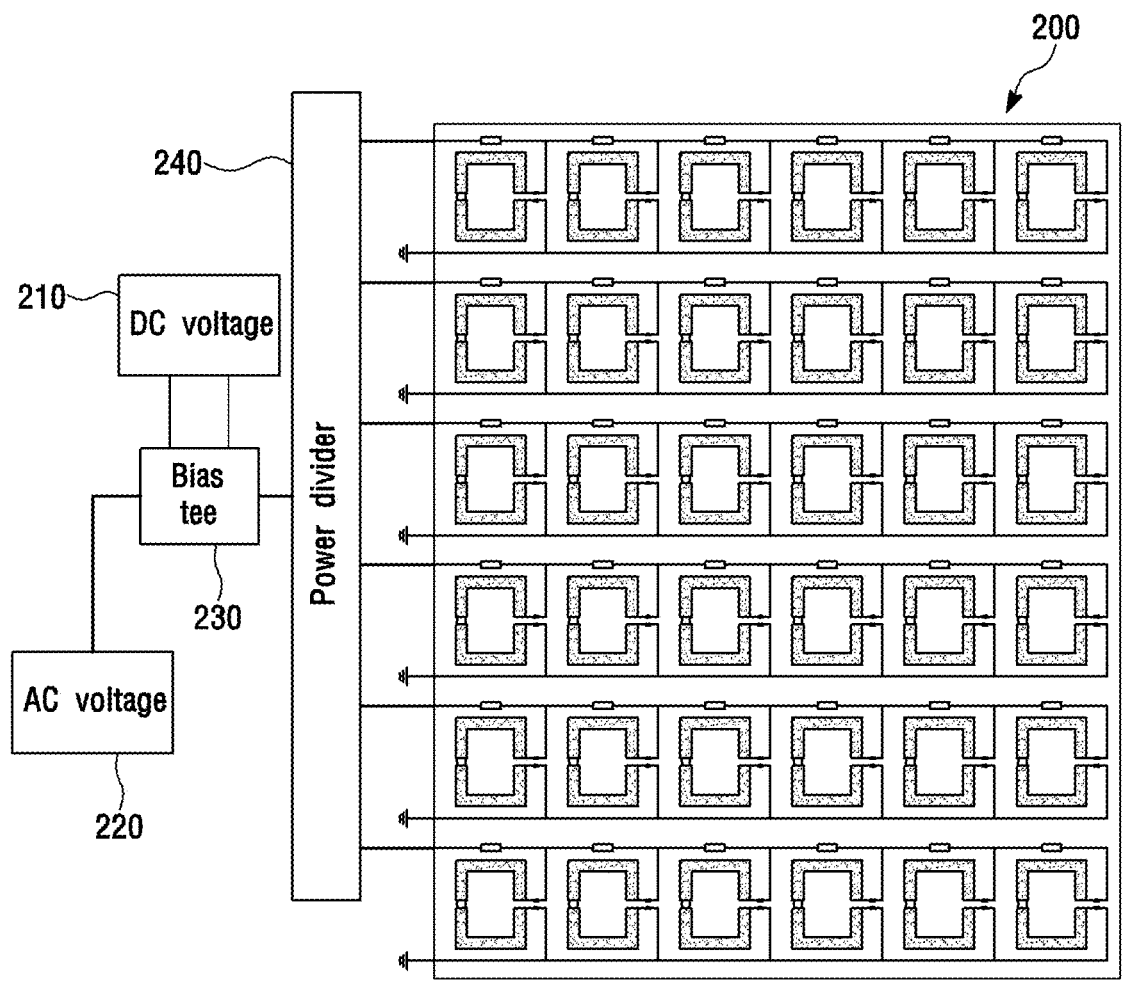
FIG. 2 is a parametric system including a parametric device according to an exemplary embodiment of the present invention.
Figure 6:
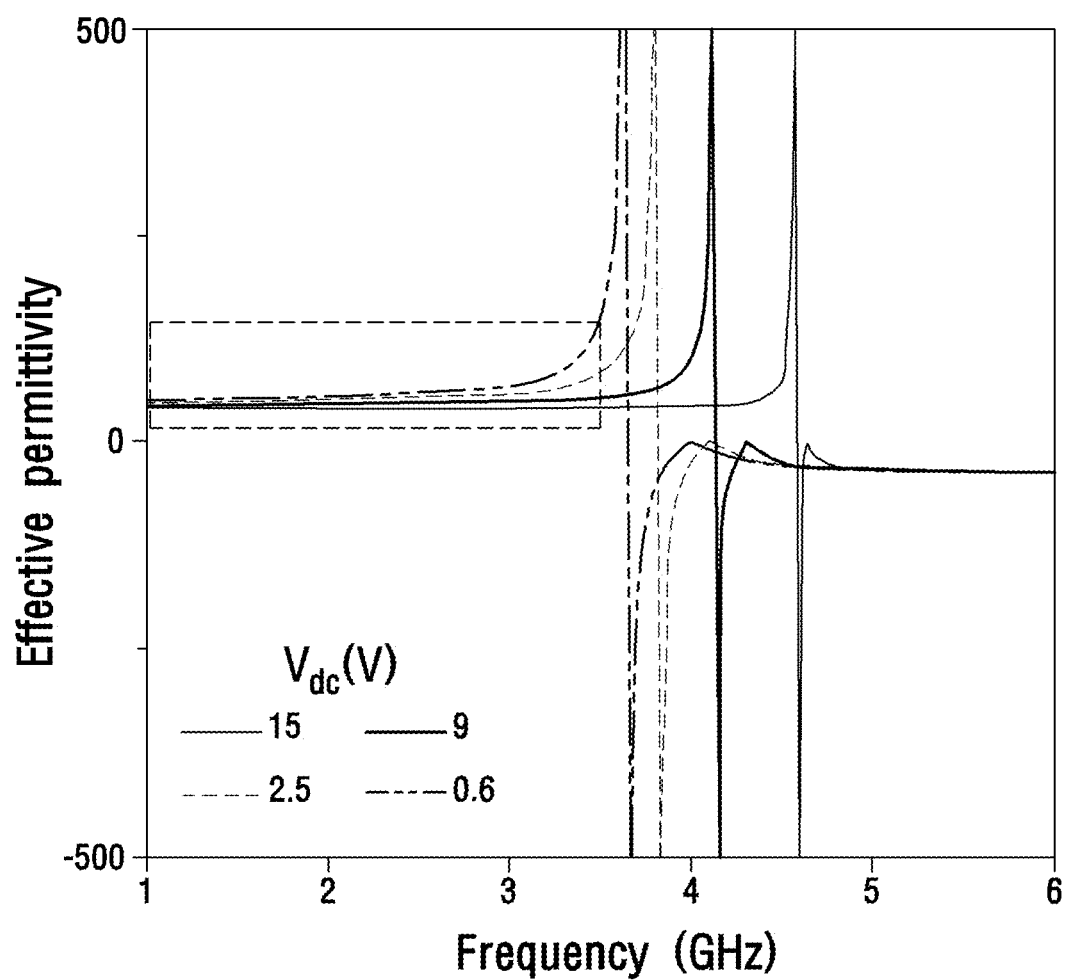

FIG. 6 is a graph related to effective permittivity depending on frequency, and is a graph illustrating that effective permittivity is different according to a DC voltage level $V_{dc}$ of a voltage signal input to the power divider 240 illustrated in FIG. 2.

Figure 7:
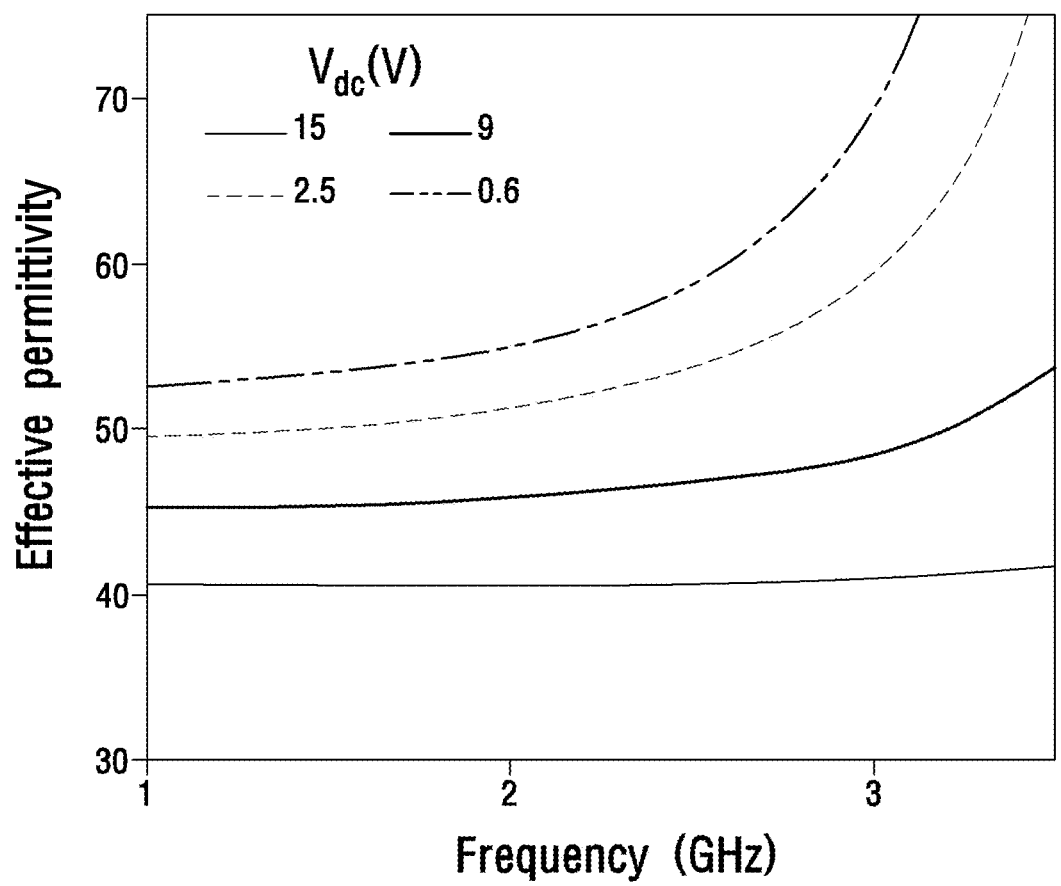

FIG. 7 is an enlarged graph of a dotted line box of FIG. 6.

Figure 1:
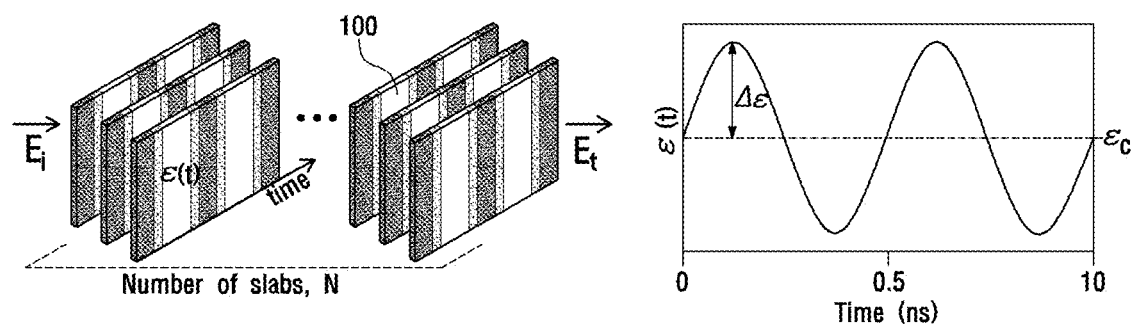
FIG. 1 is a diagram of a parametric device according to an exemplary embodiment of the present invention and a graph illustrating a change in permittivity of a slab included in the parametric device according to time.
Figure 8:
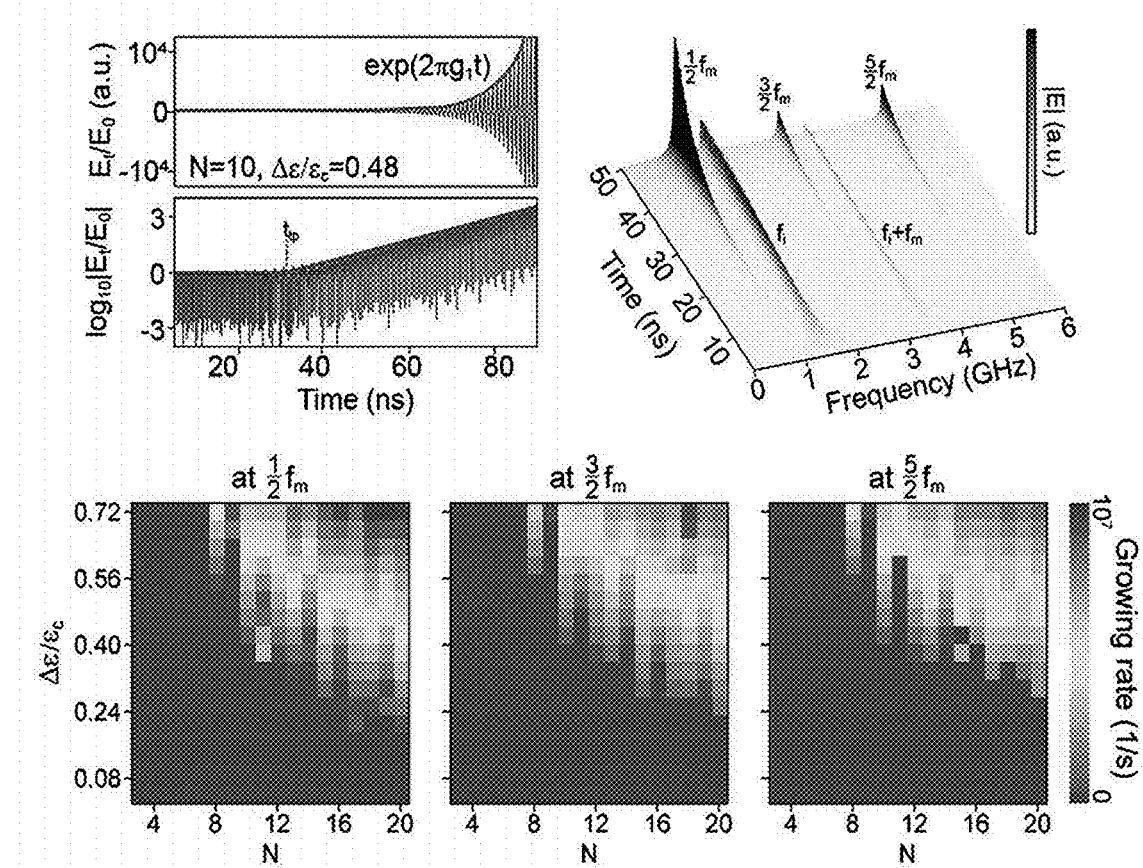

FIG. 8 is a drawing for describing electromagnetic wave modulation and oscillation characteristics of the parametric device according to the exemplary embodiment of the present invention formed of 10 slabs 100 illustrated in FIG. 1 having optical properties in which permittivity is spatiotemporally modulated.

DETAILED DESCRIPTION

Hereinafter, various exemplary embodiments of the present document will be described with reference to the accompanying drawings. However, it is not intended to limit the technology described in the document, and it should be understood to include various modifications, equivalents, and/or alternatives of the exemplary embodiments of the present document. In connection with the description of the drawings, like reference numerals may be used for like constituent components.

Since the size and thickness of each configuration illustrated in the drawings are arbitrarily indicated for convenience of description, so that the present invention is not essentially limited to the illustration of the drawings. In the drawings, the thickness of layers and regions are exaggerated for clarity. In the drawings, for understanding and ease of description, the thickness of some layers and areas is exaggerated.

Terms used in the document are used only to describe specific embodiments, and may not be intended to limit the scope of other exemplary embodiments. A singular expression includes a plural expression unless it is specifically described to the contrary in the context. All terms used herein including technical or scientific terms have the same meanings as meanings which are generally understood by those skilled in the art to which the present invention pertains. Terms defined in generally used dictionary shall be construed to have meanings matching those in the context of a related art, and shall not be construed as ideal or excessively formal meanings unless they are clearly defined in the present application. In some cases, even terms defined in the document cannot be construed to exclude the exemplary embodiments of the present document.

FIG. 1 is a diagram of a parametric device according to an exemplary embodiment of the present invention and a graph illustrating a change in permittivity of a slab included in the parametric device according to time.

Referring to FIG. 1, the parametric device according to an exemplary embodiment of the present invention includes a plurality of slabs 100 of which permittivity is periodically changed according to time and the plurality of slabs 100 is arranged at a uniform interval. In FIG. 1, $E_i$ means an electric field incident to the parametric device according to the exemplary embodiment of the present invention, and $E_t$ means an electric field that passes through the parametric device according to the exemplary embodiment of the present invention.

In the parametric device according to the exemplary embodiment of the present invention illustrated in FIG. 1, N thin slabs 100 having an optical property in which permittivity is spatiotemporally modulated according to a predetermined period is one-dimensionally arranged.

The temporal change ε(t) of the permittivity of the slab 100 may follow a sine function as illustrated in FIG. 1. Herein, the temporal change in the permittivity of the slab 100 is not limited to the sine function. The slab may also follow another function in which permittivity is periodically changed.

A material included in the slab 100 may be different depending on a frequency band.

For example, the slab 100 may include a metamaterial in a microwave band. More particularly, for example, as illustrated in FIG. 2, the parametric device may be implemented with a metamaterial combined with a varactor. The parametric device may cause time-varying properties of the metamaterial according to an AC voltage applied to the varactor. This will be described in more detail with reference to FIG. 2.

FIG. 2 is a parametric system including the parametric device according to an exemplary embodiment of the present invention.

The parametric system illustrated in FIG. 2 includes the parametric device 200, and includes a DC voltage providing unit 210, an AC voltage providing unit 220, a bias tee 230, and a power divider 240 for driving the parametric device 200.

The parametric device 200 may be formed of the plurality of unit parametric devices. The unit parametric device will be described with reference to FIG. 3.

FIG. 3 is a top plan view of only the unit parametric device of the parametric device 200 illustrated in FIG. 2.

Referring to FIG. 3, the unit parametric device 200u includes a substrate 201, metamaterial layers 202a and 202b, a varactor 203, a phase shifter 204, connection traces 205a and 205b, and line traces 206a and 206b.

The substrate 201 may be an FR-4 substrate. The substrate 201 may be a substrate made of a low loss dielectric material. The thickness of the substrate 201 may be 30 (mil) (~0.762 (mm)). The substrate 201 serves to support the metamaterial layers 202a and 202b, the connection traces 205a and 205b, and the line traces 206a and 206b.

The metamaterial layers 202a and 202b are patterned on one surface of the substrate 201.

The metamaterial layers 202a and 202b include the first metamaterial layer 202a and the second metamaterial layer 202b. The first metamaterial layer 202a and the second metamaterial layer 202b may have characteristics of an LC resonator in the microwave band due to the effective capacitance and inductance due to the arrangement of the two metal structures. Each of the first metamaterial layer 202a and the second metamaterial layer 202b may be made of copper, and may have a thickness of 1 (oz) (1.4 (mil), ~35 (um)). Each of the first metamaterial layer 202a and the second metamaterial layer 202b has a shape of "⊏", and the first metamaterial layer 202a and the second metamaterial layer 202b are disposed so that both ends of the first metamaterial layer 202a face both ends of the second metamaterial layer 202b, and are spaced by a predetermined gap g from each other.

Each of the first metamaterial layer 202a and the second metamaterial layer 202b having the shape of "⊏" has a predetermined width w.

The first metamaterial layer 202a and the second metamaterial layer 202b patterned on one surface of the substrate 201 may have a shape of "▭" as a whole. Herein a horizontal length ax may be smaller than a vertical length ay.

The unit parametric device 200u has a predetermined horizontal length px and vertical length py, and the vertical length py may be longer than the horizontal length px.

As one specific example, in FIG. 3, the gap g is 1 (mm), the width w is 5 (mm), the horizontal length ax is 47 (mm), the vertical length ay is 27 (mm), the horizontal length px is 50 (mm), and the vertical length py is 30 (mm). Here, the unit parametric element 200u shown in FIG. 3 is not limited to the above numerical values.

The varactor 203 is disposed between the first metamaterial layer 202a and the second metamaterial layer 202b. In particular, the varactor 203 may be disposed between one end between both ends of the first metamaterial layer 202a having the shape of "⊏" and one end between both ends of the second metamaterial layer 202b having the shape of "⊐". Depending on the AC voltage applied to the varactor 203, time-varying characteristics of the metamaterial layers 202a and 202b may occur. The varactor 203 has the characteristics of capacitor connected in parallel to the effective capacitance of the LC resonator composed of the first and second metamaterial layers 202a and 202b, and may cause a change in the effective dielectric constant.

The connection traces 205a and 205b include the first connection trace 205a connected between the other end between both ends of the first metamaterial layer 202a having the shape of "⊏" and the first line trace 206a, and the second connection trace 206 connected between the other end between both ends of the second metamaterial layer 202b having the shape of "⊐" and the second line trace 206b.

The line traces 206a and 206b include the first line trace 206a and the second line trace 206b. The first line trace 206a receives a voltage signal divided by the power divider 240 illustrated in FIG. 2. The second line trace 206b is connected with the ground.

The material of the connection traces 205a and 205b and the line traces 206a and 206b is copper, and the thickness may be 1 (oz) (1.4 (mil), ~35 (um)). The connection traces 205a and 205b and the line traces 206a and 206b may apply a DC signal and an AC signal to each varactor 203 positioned on a plurality of slabs.

The phase shifter 204 is disposed on the first line trace 206a, and shifts a phase of the input voltage signal by a predetermined phase. The phase shifter 204 is disposed in every unit parametric element 200u in the parameter device 200 illustrated in FIG. 2. Accordingly, the phase shifters 204 are disposed on the first line trace 206a as many as the number of unit parametric devices 200u. The phase shifter 204 serves to match the phase of the (AC+DC) signal received by each varactor 203 located on the plurality of slabs.

That is, referring to FIG. 2, the parametric device 200 has the shape in which the plurality of unit parametric devices 200u illustrated in FIG. 3 is arranged in a matrix form. Herein, the substrate 201 for each unit parametric device 200u may be configured as one substrate, instead of being separate from each other.

Figure 4:
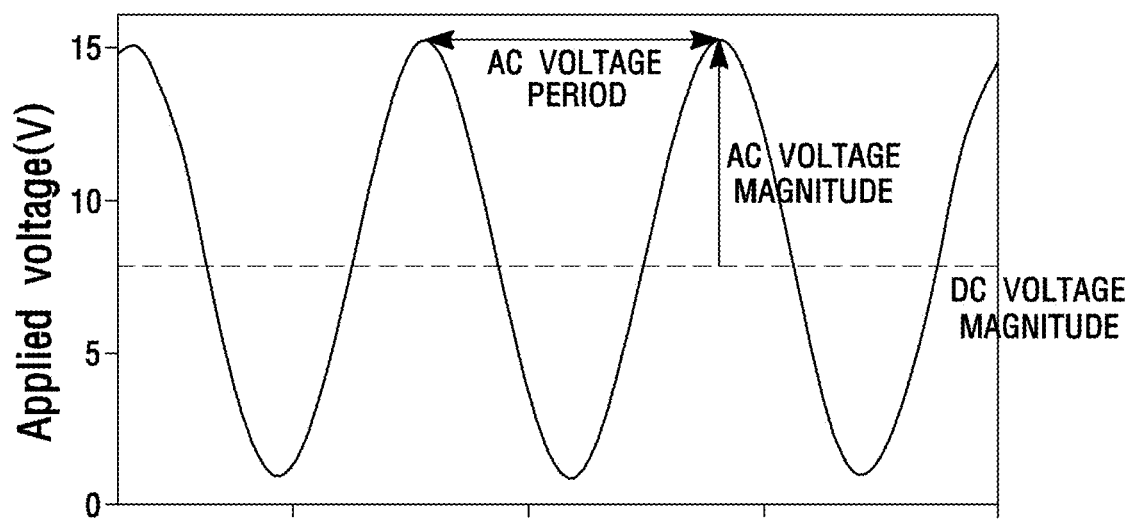
FIG. 4 is a graph illustrating an example of a voltage signal input to a power divider 240 illustrated in FIG. 2.

The DC voltage providing unit 210 and the AC voltage providing unit 220 generate and output a predetermined DC voltage and a predetermined AC voltage, respectively. The bias tee 230 sums the DC voltage from the DC voltage providing unit 210 and the AC voltage from the AC voltage providing unit 220 and provides the summed voltage to the power divider 240. In more particular, the AC voltage providing unit 220 may output the AC voltage having a predetermined period and amplitude illustrated in FIG. 4, and the DC voltage providing unit 210 may output a predetermined DC voltage of about 7 to 8 V illustrated in FIG. 4. The bias tee 230 sums the AC voltage and the DC voltage as illustrated in FIG. 4. The voltage signal of the waveform illustrated in FIG. 4 is input to the power divider 240.

The power divider 240 receives the voltage signal output from the bias tee 230 and divides the received voltage signal. In more particular, the power divider 240 divides the input voltage signal and outputs the divided voltage signal to each of the plurality of first line traces connected to the power divider 240.

An upper graph of FIG. 5 illustrates the case where a magnitude of an AC voltage applied to the varactor 203 illustrated in FIG. 3 periodically changes according to time, and a lower graph of FIG. 5 illustrates effective permittivity of the unit parameter device 200u illustrated in FIG. 3 periodically changes according to time by the varactor 203.

Referring to FIG. 5, it can be seen that the effective permittivity of the unit parametric device 200u follows the same period as that of the AC voltage applied to the varactor 203, but has an opposite phase.

FIG. 6 is a graph related to effective permittivity depending on frequency, and is a graph illustrating that effective permittivity is different according to a DC voltage level $V_{dc}$ of a voltage signal input to the power divider 240 illustrated in FIG. 2, and FIG. 7 is an enlarged graph of a dotted line box of FIG. 6.

Referring to FIGS. 6 and 7, it can be seen that as the frequency increases, the effective permittivity increases, and as the DC voltage level $V_{dc}$ is smaller, the amount of change in the effective permittivity further increases according to the increase in frequency.

In the meantime, referring back to FIG. 1 again, in a terahertz band, the slab 100 may include a material having short delay time, such as low-temperature gallium arsenide (LT-GaAs) or graphene.

The thickness of the slab may be smaller than a half of the incident wavelength and the wavelength (=speed of light/$f_m$) according to and the permittivity change period. Herein, $f_m$ is a modulated frequency of the permittivity of the slab.

A distance (or gap) between the slabs may be shorter than the incident wavelength and the wavelength (=speed of light/$f_m$) according to the permittivity change period. Herein, when the distance (or gap) between the slabs may be longer than the incident wavelength, amplification phenomenon may not occur. The distance (or gap) between the slabs may be shorter than the wavelength according to the permittivity change period.

The number N of slabs 100 included in the parametric device according to the exemplary embodiment of the present invention and the modulation magnitude Δε affect the following cases.

(1) When the parametric device is operated as a frequency converter, the number N of slabs 100 and the modulation magnitude Δε affect the conversion rate of the frequency.

(2) When the parametric device is operated as a frequency oscillator, the number N of slabs 100 and the modulation magnitude Δε affect the start time of the oscillation and a growing rate.

FIG. 8 is a drawing for describing electromagnetic wave modulation and oscillation characteristics of the parametric device according to the exemplary embodiment of the present invention formed of 10 slabs 100 illustrated in FIG. 1 having optical properties in which permittivity is spatiotemporally modulated.

Referring to the upper graphs of FIG. 8, when the number N of thin slabs having the optical property in which permittivity is periodically changed with time is 10, the amount of modulation (Δε/ε) of permittivity according to time is 0.48.

The parametric device is operated as the frequency modulator before a specific time $t_{tp}$, and is operated as the oscillator after the specific time $t_{tp}$. Herein, $f_i$ illustrated in FIG. 8 means a frequency of light incident into the parametric device, and $f_m$ means a modulation frequency of the permittivity of the slab.

Referring to the graphs illustrated in FIG. 8, it can be seen that the frequency modulation characteristic and the oscillation characteristic are different before and after the specific time $t_{tp}$.

When the parametric device is operated as the oscillator, the frequency of the oscillated electromagnetic wave is fixed only to an integer multiple of ½×$f_m$.

The lower graphs of FIG. 8 represent the results of the calculation of the growing rate of the electromagnetic wave according to the number N of slabs and the value of the amount of modulation (Δε/ε) for the respective oscillation frequencies when the parametric device is operated as the oscillator.

Referring to the lower graphs of FIG. 8, it can be seen that as the number N of slabs and the value of the amount of modulation (Δε/ε) are larger, the larger growing rate is exhibited. The result suggests that a designer is capable of directly designing an oscillation characteristic of the parametric device.

As described above, the parametric device according to the exemplary embodiment of the present invention is the parametric device in which the artificial medium slabs, of which effective permittivity is rapidly modulated according to time, are periodically arranged, and may be utilized as a parametric frequency amplifier or a parametric oscillator capable of generating an electromagnetic wave of a desired frequency. For example, when the modulation intensity of the effective permittivity is small, the parametric device may be operated as the parametric frequency amplifier, and when the modulation intensity of the effective permittivity is sufficiently large, the parametric device may be operated as the parametric oscillator. Herein, the large modulation intensity of the effective permittivity means that the change rate of the permittivity of the parametric device changes with a large width. The criteria for dividing the modulation intensity into large and small are affected by the materials constituting the corresponding parametric device, the shape of the pattern, the number of slabs, a width of the slab, and the like.

Herein, when the parametric device is operated as the frequency amplifier, the generated frequency may be determined by a mixture of the frequency of the electromagnetic wave incident into the corresponding element and the modulation frequency of the artificial medium slab.

Herein, when the parametric device is operated as the frequency oscillator, the amplification frequency may be determined by the modulation frequency and a spatial arrangement period of the artificial medium slab.

Herein, when the parametric device is operated as the frequency oscillator, a propagation direction of the electromagnetic wave oscillated in the element may be determined according to a phase difference between the artificial media.

The parametric device according to the exemplary embodiment of the present invention uses the effective property change by an external input, not an inherent nonlinear response of the medium, so that it is possible to broadly control the intensity, the frequency, and the propagation direction of the generated electromagnetic wave, compared to the existing element.

As described above with reference to the drawings, it has been verified that the parametric device according to the exemplary embodiment of the present invention may amplify and oscillate a predetermined frequency signal. This is applicable to a completely new form of optical device. Further, the parametric device according to the exemplary embodiment of the present invention may suggest a new direction for the research on a spatiotemporal modulated optical material that is actively studied worldwide, and may be developed to a business that supplies and develops a new concept spatiotemporal modulated optical device.

Although the exemplary embodiments of the present invention have been described in detail above, the scope of the present invention is not limited thereto, and various modifications and improvements by those skilled in the art using the basic concept of the present invention defined in the accompanying claims also belong to the scope of the present invention.

What is claimed is:

1. A parametric device, comprising:
a plurality of slabs of which permittivity is periodically changed over time and which has a predetermined thickness,
wherein the plurality of slabs is arranged at regular intervals,
wherein the parametric device is operated as a frequency modulator before a specific time $t_{tp}$, and is operated as an oscillator after the specific time.

2. A parametric device, comprising:
a plurality of slabs of which permittivity is periodically changed over time and which has a predetermined thickness,
wherein the plurality of slabs is arranged at regular intervals,
wherein a material included in the slab is different according to a frequency band,
when the frequency band is a microwave band, the slab includes a metamaterial, and
when the frequency band is a terahertz band, the slab includes a low temperature gallium arsenic (LT-GaAs) or graphene.

3. A parametric device, comprising:
a plurality of slabs of which permittivity is periodically changed over time and which has a predetermined thickness,
wherein the plurality of slabs is arranged at regular intervals,
wherein a distance (or a gap) between two adjacent slabs among the plurality of slabs is shorter than an incident wavelength and a wavelength (=speed of light/$f_m$) according to a permittivity change period, and
$f_m$ is a modulation frequency of the permittivity of the slab.

4. A parametric device, comprising:
a plurality of slabs of which permittivity is periodically changed over time and which has a predetermined thickness,
wherein the plurality of slabs is arranged at regular intervals,
wherein when the number of slabs and a value of the amount of modulation of the permittivity of the slab are large, a frequency growing rate increases.

* * * * *